March 24, 1959     A. A. LARSEN     2,878,881
LAND CLEARING ATTACHMENT FOR TRACTORS
Filed July 8, 1955     3 Sheets-Sheet 2
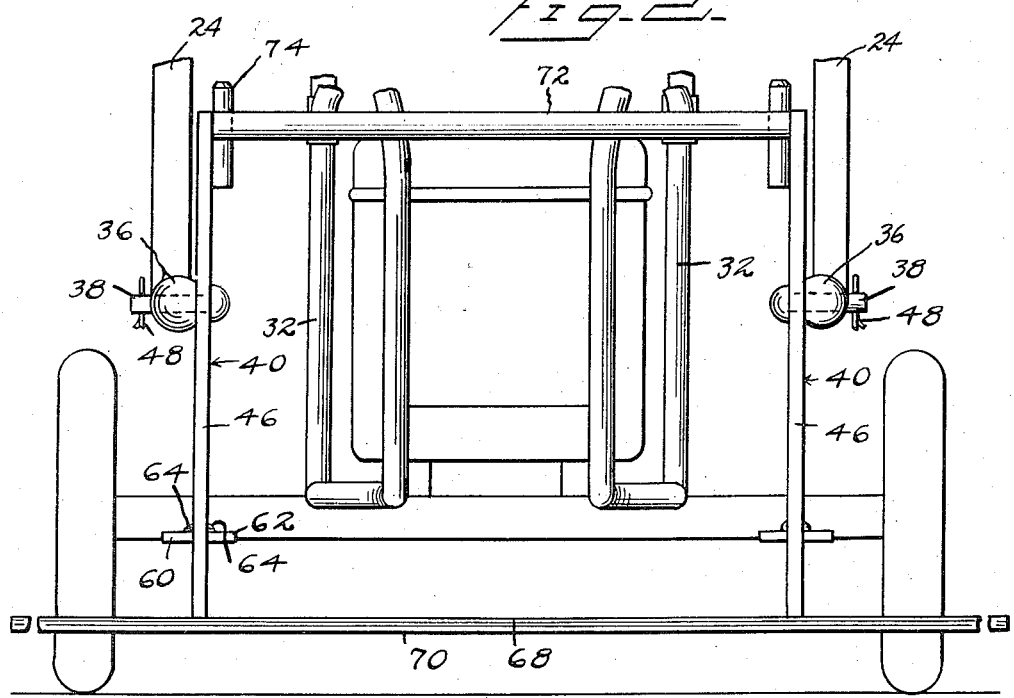
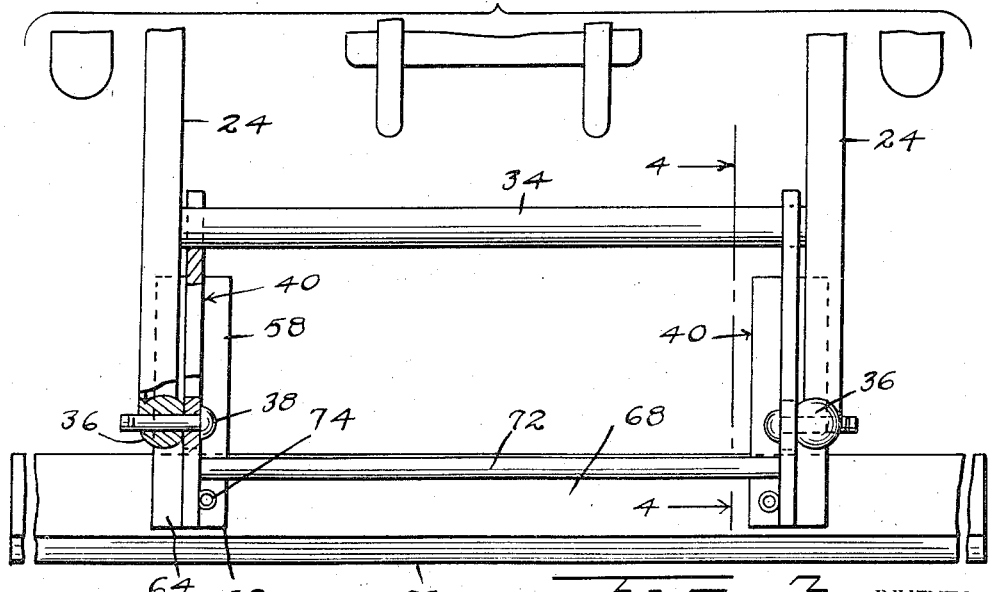
INVENTOR
A. A. Larsen
BY Kimmel & Crowell
ATTORNEYS March 24, 1959  A. A. LARSEN  2,878,881
LAND CLEARING ATTACHMENT FOR TRACTORS
Filed July 8, 1955  3 Sheets-Sheet 3
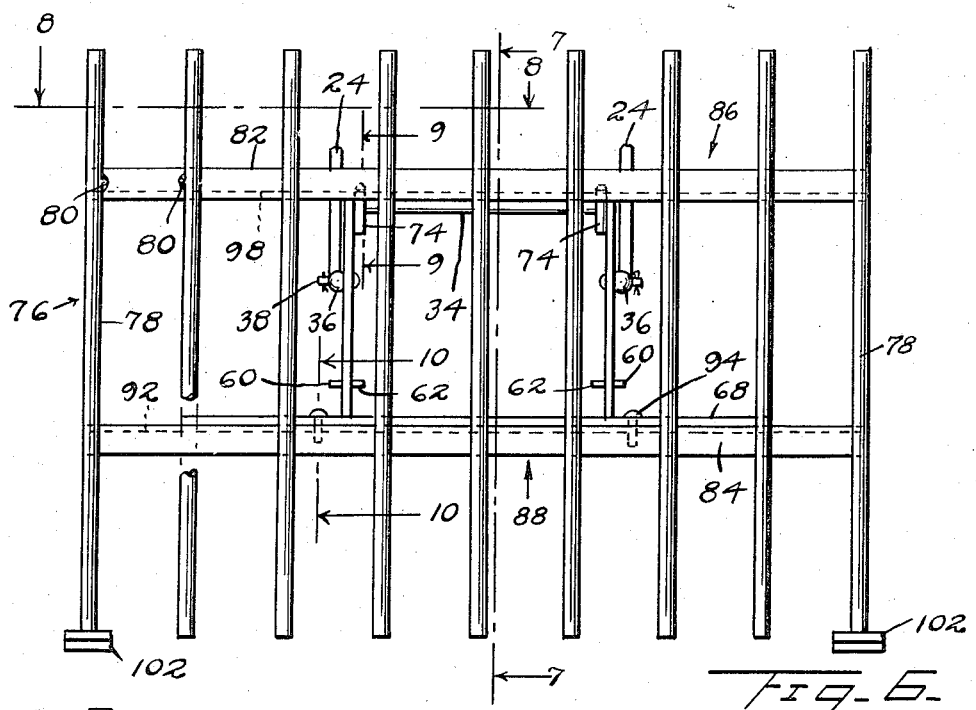
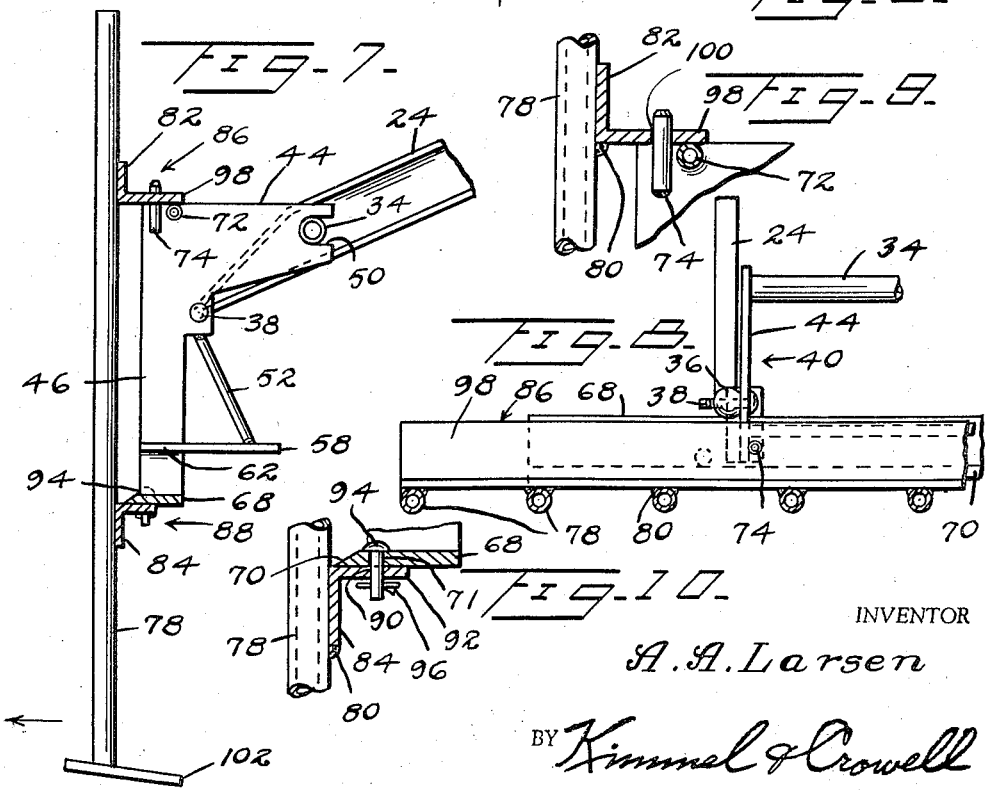
INVENTOR
A. A. Larsen
BY Kimmel & Crowell
ATTORNEYS

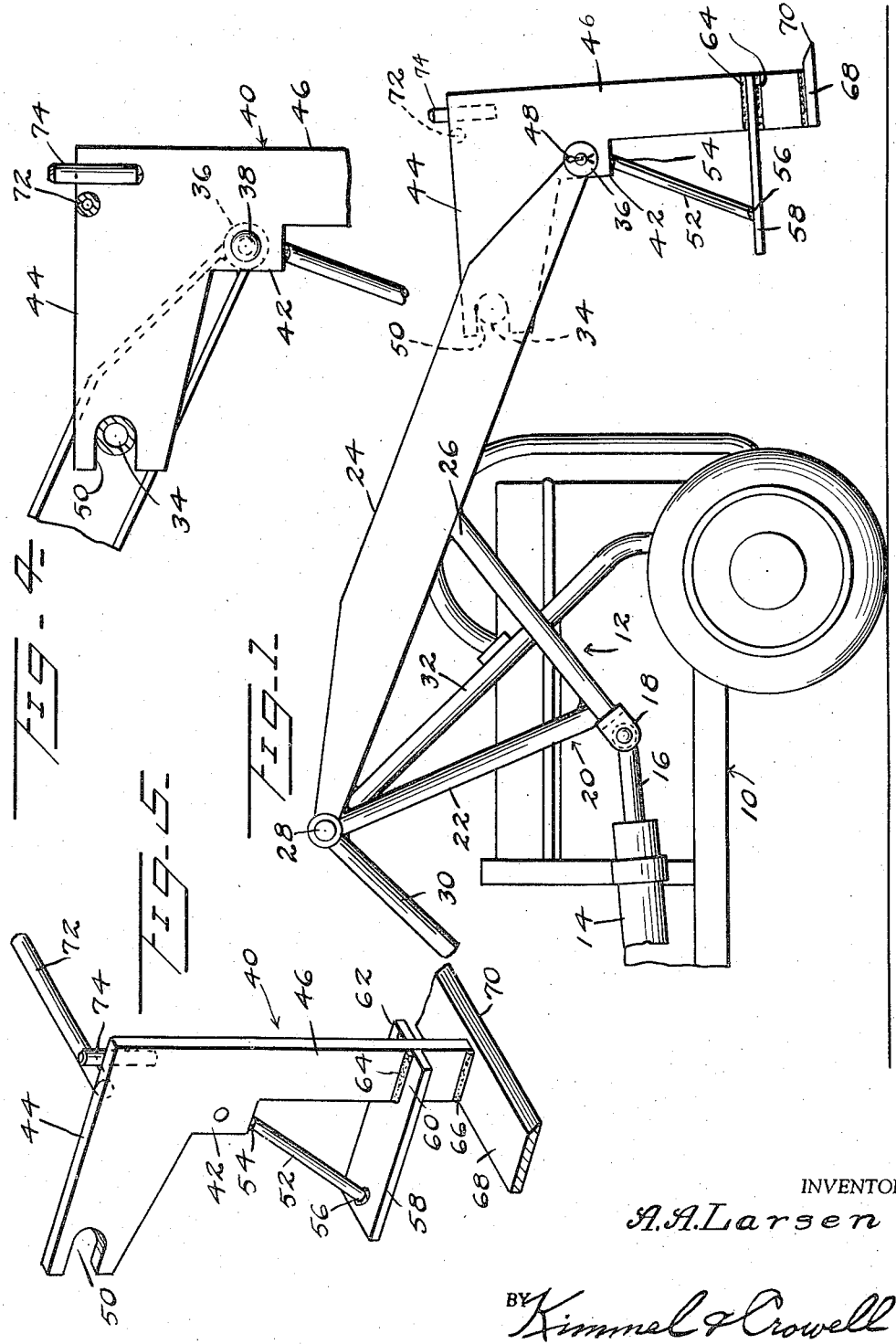

United States Patent Office 2,878,881
Patented Mar. 24, 1959

2,878,881

LAND CLEARING ATTACHMENT FOR TRACTORS

Andrew A. Larsen, Salem, Oreg.

Application July 8, 1955, Serial No. 520,834

2 Claims. (Cl. 172—276)

This invention relates to an attachment for a tractor, and more specifically, the invention pertains to attachments for clearing desert land of sagebrush as well as other small brush.

One of the primary objects of this invention is to provide a tractor with a sage brush cutting blade together with hydraulic means for adjusting the elevation thereof.

A further object of this invention is to provide a land clearing attachment for a tractor, the attachment including a brush severing blade and a support frame therefor, and including means for mounting a brush rake or windrowing device thereon.

It is a further object of this invention to provide an attachment of the type to which reference has been made above which is inexpensive to manufacture and assemble, non-complex in operation, and durable in use.

Other and further objects and advantages of the instant invention will become more manifest from a consideration of the following specification when read in conjunction with the annexed drawings, in which:

Figure 1 is a side elevational view of a land clearing device constructed in accordance with the present invention, Figure 1 illustrating the device as being mounted on the hydraulic lifting elements of a conventional tractor.

Figure 2 is an end elevational view of the attachment shown in Figure 1.

Figure 3 is a top plan view of the attachment with elements thereof being broken away for a clearer illustration of the construction of the attachment.

Figure 4 is an enlarged fragmentary detail cross-sectional view taken on the vertical plane of line 4—4 of Figure 3, looking in the direction of the arrows.

Figure 5 is an enlarged fragmentary detail perspective view of one of the side frame members and the associated blade.

Figure 6 is an front elevational view of a rake attachment constructed in accordance with this invention.

Figure 7 is an enlarged cross-sectional view taken on the vertical plane of line 7—7 of Figure 6, looking in the direction of the arrows.

Figure 8 is an enlarged detail cross-sectional view taken on the horizontal plane of line 8—8 of Figure 6, looking in the direction of the arrows.

Figure 9 is an enlarged fragmentary detail cross-sectional view taken on the vertical plane of line 9—9 of Figure 6, looking in the direction of the arrows.

Figure 10 is an enlarged detail cross-sectional view taken on the vertical plane of line 10—10 of Figure 6, looking in the direction of the arrows.

Referring now more specifically to the drawings, reference numeral 10 designates, in general, a conventional tractor having a Dearborn hydraulic lift 12 mounted thereon. As is seen in Figure 1 of the drawings, the lift 12 includes a pair of oppositely disposed hydraulic cylinders 14 fixedly secured to opposite sides of the tractor 10. The hydraulic cylinder 14 is provided with the conventional reciprocating piston rod 16 which has the outer end thereof pivotally connected to the apex 18 of a bell crank lever 20. The remote end of the bell crank lever arm 22 is fixedly secured to one end of a substantially trapezoidal truss 24, and the other bell crank lever arm 26 is also fixedly secured to the truss 24 intermediate the ends thereof.

As is seen in Figure 1 of the drawings, the trusses 24 at each side of the tractor 10 are pivotally mounted on a cross-shaft 28 which is held in fixed position by means of braces 30, 32. The trusses 24 project beyond the forward end of the tractor 10 and the forward ends thereof are maintained in spaced substantially parallel position by means of rod 34 which extends transversely therebetween and has its opposite ends fixedly secured thereto.

The forward ends of the trusses 24 terminate in enlarged substantially spherical bosses 36 on which are connected by bolts 38 a pair of laterally spaced, parallel, inverted and reversed L-shaped side frame plates indicated generally at 40. The connections are made through shoulders 42 formed at the inner corners formed at the junction of the foot portions 44 with the leg portions 46, and the bolts 38 are held against accidental or inadvertent displacement by cotter pins 48.

Recesses 50 extend inwardly from the outer ends of the foot portions 44 and receive therein the rod 34. Elongated circular reinforcing struts 52 have one of their respective ends fixedly secured by welding 54 to the shoulders 42 and the other ends thereof depend rearwardly therefrom at an angle and are welded or otherwise secured at 56 to cross-brace shoes 58 adjacent the rear end thereof. The forward ends of the cross-brace shoes 58 are bifurcated forming arms 60, 62 which engage against opposite sides of each of the leg portions 46 adjacent the lower ends thereof and are welded at 64 thereto. The lower ends of the leg portions 46 are welded at 66 to a horizontally elongated substantially rectangular cutting blade 68 having a leading cutting edge 70. The blade 68, as seen in Figure 10, is also provided with a plurality of vertically extending bores 71 which serve a purpose to be set forth clearly below.

A horizontally elongated cylindrical spacer pipe 72 has its opposed ends fixedly secured to the confronting adjacent sides of the foot portions 44 proximate the inner ends thereof and a short vertically extending stub pipe or rod 74 is fixedly mounted on each confronting side of the foot portions 44 forwardly of the pipe 72 and serve a function to be described.

To operate the above described attachment, the operator moves the control for the hydraulic cylinders 14 to effect an inward movement of the piston rods 16 causing the forward ends of the trusses 24 to pivot downwardly and to position the blade 68 at a desired elevation. The blade 68 in this case is operated under the surface of the ground, at a depth preferably approximately 4 inches, or thereabouts. This blade 68, as so placed and levelled by the hydraulic cylinders 14 below the surface of the ground and moves along, cutting off the roots from underneath the top of the coil, at a depth of approximately 4 inches. The shoes 58 above the blade 68 ride along the surface of the ground and are for the purpose of gauging the depth of the blade 68 below the surface of the ground.

After the brush is cut it is, of course, necessary to rake or windrow the severed brush. To this end a rake, generally designated by reference numeral 76, is provided. The rake 76 comprises a plurality of regularly spaced elongated vertically extending cylindrical pipes 78 fixedly secured, as by welding 80, to one side 82, 84 of a pair of horizontally elongated vertically spaced angle irons 86, 88. The lowermost angle iron 88 has a plurality of vertical bores 90 formed in the side 92 thereof which are adapted for alignment with the bores 71 of the blade 68, and the registered bores 71, 90 receive pins 94 therethrough which are held in place by cotter pins 96. The uppermost angle iron 86 has in its side 98 bores 100 proximate each end thereof to receive the upper ends of the rods 74 therein. The side 98 projects rearwardly to seat on the spacer pipe 72.

The outermost positioned pipes 78 have fixedly secured to the lower ends thereof skids or shoes 102 which are downwardly and rearwardly inclined.

With the rake 76 installed in the manner described the operator actuates the hydraulic cylinder 14 so that the skids 102 lightly engage the ground and the tractor 10 is then operated over the wasteland to rake and windrow the severed sage brush and other brush.

Having described and illustrated this invention in detail, it will be understood that the present disclosure is merely by way of example, and that the invention is to be limited only by the scope of the appended claims.

What is claimed is:

1. An attachment for a tractor having a forwardly extending hydraulically operated lift truss extending forwardly at each side thereof, a cross-brace extending between and secured to the confronting adjacent sides of said trusses adjacent the forward ends thereof, a pair of inverted and reversed L-shaped side frame members having foot and leg portions, means pivotally connecting one of said side frame members with the forward end of each of said trusses, respectively, whereby said frame members depend therefrom, said foot portions of said members having a recess formed at the outer ends thereof and receiving said cross-brace therein, an elongated substantially rectangular blade fixedly secured to the depending ends of said leg portions of said side frame members, said blade having a sharpened leading edge, reinforcing means for each of said frame members, said means comprising a shoulder formed at the junction of said foot and leg portions, a pair of struts each having one of its ends fixedly secured to a respective one of said shoulders with the other end thereof projecting downwardly and rearwardly, a pair of elongated substantially rectangular plates each having a bifurcated end engaging respective opposite sides of said frame members, and means fixedly securing said plates respectively to said frame members and to the other ends of said struts.

2. An attachment as defined in claim 1, and a spacer pipe extending between and fixedly secured to the confronting adjacent sides of said foot portions.

References Cited in the file of this patent

UNITED STATES PATENTS

| | | |
|---|---|---|
| 2,614,376 | Madsen | Oct. 21, 1952 |
| 2,662,359 | Neilsen | Dec. 15, 1953 |
| 2,679,131 | Martinson | May 25, 1954 |
| 2,703,044 | Adair | Mar. 1, 1955 |
| 2,709,326 | Coombe | May 31, 1955 |
| 2,732,637 | Shadden | Jan. 31, 1956 |
| 2,734,290 | Tuttle | Feb. 14, 1956 |
| 2,751,696 | Weinhold | June 26, 1956 |